(12) United States Patent
Mody et al.

(10) Patent No.: US 10,871,878 B1
(45) Date of Patent: Dec. 22, 2020

(54) SYSTEM LOG ANALYSIS AND OBJECT USER INTERACTION CORRELATION SYSTEM

(71) Applicant: PALANTIR TECHNOLOGIES INC., Palo Alto, CA (US)

(72) Inventors: Arjun Mody, Palo Alto, CA (US); Gabriele Fisher, Stanford, CA (US); Michael Glazer, San Jose, CA (US)

(73) Assignee: Palantir Technologies Inc., Denver, CO (US)

( * ) Notice: Subject to any disclaimer, the term of this patent is extended or adjusted under 35 U.S.C. 154(b) by 930 days.

(21) Appl. No.: 15/209,651

(22) Filed: Jul. 13, 2016

Related U.S. Application Data

(60) Provisional application No. 62/272,496, filed on Dec. 29, 2015.

(51) Int. Cl.
*G06F 3/0482* (2013.01)
*H04L 29/08* (2006.01)
*G06F 16/9535* (2019.01)

(52) U.S. Cl.
CPC ........ *G06F 3/0482* (2013.01); *G06F 16/9535* (2019.01); *H04L 67/22* (2013.01)

(58) Field of Classification Search
CPC ..... G06F 3/0482; G06F 16/9535; H04L 67/22
See application file for complete search history.

(56) References Cited

U.S. PATENT DOCUMENTS

| | | |
|---|---|---|
| 5,515,488 A | 5/1996 | Hoppe et al. |
| 6,430,305 B1 | 8/2002 | Decker |
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

J. Lee, M. Park, J. Eom and T. Chung, "Multi-level Intrusion Detection System and log management in Cloud Computing," 13th International Conference on Advanced Communication Technology (ICACT2011), Seoul, 2011, pp. 552-555. (Year: 2011).*

(Continued)

*Primary Examiner* — James T Tsai
(74) *Attorney, Agent, or Firm* — Knobbe, Martens, Olson & Bear, LLP

(57) ABSTRACT

Methods, systems, and apparatus, including computer programs encoded on computer storage media, for system log analysis and object-user interaction. Log data generated by network accessible systems can describe user interactions with objects maintained by the network accessible systems. A system can correlate log data to determine user access of objects. The system can generate user interfaces describing access to objects, and further determine objects being accessed with a greater frequency than other objects. The system can cause the objects to be stored by more than one network accessible system.

20 Claims, 14 Drawing Sheets

(56) References Cited

U.S. PATENT DOCUMENTS

| | | |
|---|---|---|
| 7,617,232 B2 | 11/2009 | Gabbert et al. |
| 7,756,843 B1 | 7/2010 | Palmer |
| 7,800,796 B2 | 9/2010 | Saito |
| 7,908,559 B1 * | 3/2011 | Denise ............... G06F 16/9038 |
| | | 715/738 |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,129,321 B2 | 9/2015 | Boding et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 9,338,013 B2 | 5/2016 | Castellucci et al. |
| 9,516,052 B1 * | 12/2016 | Chauhan ............... G06F 16/25 |
| 10,027,473 B2 | 7/2018 | Castellucci et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2005/0234909 A1 | 10/2005 | Bade et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0208737 A1 * | 9/2007 | Li ............... H04L 67/26 |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0271637 A1 | 10/2009 | Takekawa et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |

(56) References Cited

U.S. PATENT DOCUMENTS

| | | |
|---|---|---|
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1* | 2/2013 | Antony ............ G05B 19/41875 715/781 |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0173610 A1* | 7/2013 | Hu ........................ G06F 16/951 707/728 |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0082513 A1* | 3/2014 | Mills .................... H04L 41/069 715/744 |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0319203 A1* | 11/2015 | Jeremias ................ H04L 51/20 715/753 |
| 2015/0338233 A1 | 11/2015 | Cervelli et al. |
| 2015/0363289 A1* | 12/2015 | Brough ................ H04W 24/10 709/224 |
| 2015/0379413 A1 | 12/2015 | Robertson et al. |
| 2016/0004764 A1 | 1/2016 | Chakerian et al. |
| 2016/0012654 A1* | 1/2016 | Sherony ............. G07C 9/00309 340/5.61 |
| 2016/0132608 A1* | 5/2016 | Rathod .................... H04W 4/21 707/722 |
| 2017/0031565 A1* | 2/2017 | Chauhan ............. G06F 3/04847 |
| 2017/0302753 A1* | 10/2017 | Larumbe ............. H04L 67/2842 |
| 2018/0302216 A1 | 10/2018 | Castellucci et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 1962222 | 8/2008 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| EP | 2897051 | 8/2017 |
| EP | 3255549 | 12/2017 |
| WO | WO 2005/116851 | 12/2005 |
| WO | WO 2012/061162 | 5/2012 |

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Appacts, "Smart Thinking for Super Apps," http://www.appacts.com Printed Jul. 18, 2013 in 4 pages.

Apsalar, "Data Powered Mobile Advertising," "Free Mobile App Analytics" and various analytics related screen shots http://apsalar.com Printed Jul. 18, 2013 in 8 pages.

Capptain—Pilot Your Apps, http://www.capptain.com Printed Jul. 18, 2013 in 6 pages.

Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.

Chaudhuri et al., "An Overview of Business Intelligence Technology," Communications of the ACM, Aug. 2011, vol. 54, No. 8.

Cohn, et al., "Semi-supervised clustering with user feedback," Constrained Clustering: Advances in Algorithms, Theory, and Applications 4.1 (2003): 17-32.

Countly Mobile Analytics, http://count.ly/ Printed Jul. 18, 2013 in 9 pages.

DISTIMO—App Analytics, http://www.distimo.com/app-analytics Printed Jul. 18, 2013 in 5 pages.

Flurry Analytics, http://www.flurry.com/ Printed Jul. 18, 2013 in 14 pages.

Gill et al., "Computerised Linking of Medical Records: Methodological Guidelines," Journal of Epidemiology and Community Health, 1993, vol. 47, pp. 316-319.

Google Analytics Official Website—Web Analytics & Reporting, http://www.google.com/analytics.index.html Printed Jul. 18, 2013 in 22 pages.

Gorr et al., "Crime Hot Spot Forecasting: Modeling and Comparative Evaluation", Grant 98-IJ-CX-K005, May 6, 2002, 37 pages.

Gu et al., "Record Linkage: Current Practice and Future Directions," Jan. 15, 2004, pp. 32.

Hansen et al., "Analyzing Social Media Networks with NodeXL: Insights from a Connected World", Chapter 4, pp. 53-67 and Chapter 10, pp. 143-164, published Sep. 2010.

(56) References Cited

OTHER PUBLICATIONS

Hua et al., "A Multi-attribute Data Structure with Parallel Bloom Filters for Network Services", HiPC 2006, LNCS 4297, pp. 277-288, 2006.

"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Kontagent Mobile Analytics, http://www.kontagent.com/ Printed Jul. 18, 2013 in 9 pages.

Localytics—Mobile App Marketing & Analytics, http://www.localytics.com/ Printed Jul. 18, 2013 in 12 pages.

Manno et al., "Introducing Collaboration in Single-user Applications through the Centralized Control Architecture," 2010, pp. 10.

Mixpanel—Mobile Analytics, https://mixpanel.com/ Printed Jul. 18, 2013 in 13 pages.

Open Web Analytics (OWA), http://www.openwebanalytics.com/ Printed Jul. 19, 2013 in 5 pages.

Piwik—Free Web Analytics Software. http://piwik.org/ Printed Jul. 19, 2013 in18 pages.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

"SAP BusinessObjects Explorer Online Help," Mar. 19, 2012, retrieved on Apr. 21, 2016 http://help.sap.com/businessobject/product_guides/boexir4/en/xi4_exp_user_en.pdf.

Sigrist, et al., "PROSITE, a Protein Domain Database for Functional Characterization and Annotation," Nucleic Acids Research, 2010, vol. 38, pp. D161-D166.

StatCounter—Free Invisible Web Tracker, Hit Counter and Web Stats, http://statcounter.com/ Printed Jul. 19, 2013 in 17 pages.

TestFlight—Beta Testing on the Fly, http://testflightapp.com/ Printed Jul. 18, 2013 in 3 pages.

trak.io, http://trak.io/ printed Jul. 18, 2013 in 3 pages.

UserMetrix, http://usermetrix.com/android-analytics printed Jul. 18, 2013 in 3 pages.

Valentini et al., "Ensembles of Learning Machines", M. Marinaro and R. Tagliaferri (Eds.): WIRN VIETRI 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wikipedia, "Multimap," Jan. 1, 2013, https://en.wikipedia.org/w/index.php?title-Multimap&oldid=530800748.

Wikipedia, "Mobile Web," Jan. 23, 2015, retrieved from the internet on Mar. 15, 2016 https://en.wikipedia.org/w/index.php?title-Mobile_Web&oldid=643800164.

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

Notice of Allowance for U.S. Appl. No. 14/225,084 dated May 4, 2015.

Notice of Allowance for U.S. Appl. No. 14/319,161 dated May 4, 2015.

Notice of Allowance for U.S. Appl. No. 14/323,935 dated Oct. 1, 2015.

Notice of Allowance for U.S. Appl. No. 14/479,863 dated Mar. 31, 2015.

Notice of Allowance for U.S. Appl. No. 14/483,527 dated Apr. 29, 2016.

Notice of Allowance for U.S. Appl. No. 14/552,336 dated Nov. 3, 2015.

Notice of Allowance for U.S. Appl. No. 14/746,671 dated Jan. 21, 2016.

Notice of Allowance for U.S. Appl. No. 14/858,647 dated Mar. 4, 2016.

Official Communication for European Patent Application No. 14187996.5 dated Feb. 12, 2015.

Official Communication for European Patent Application No. 14187996.5 dated Feb. 19, 2016.

Official Communication for European Patent Application No. 14191540.5 dated May 27, 2015.

Official Communication for European Patent Application No. 14200246.8 dated May 29, 2015.

Official Communication for European Patent Application No. 14200298.9 dated May 13, 2015.

Official Communication for European Patent Application No. 15181419.1 dated Sep. 29, 2015.

Official Communication for European Patent Application No. 15184764.7 dated Dec. 14, 2015.

Official Communication for European Patent Application No. 15200073.3 dated Mar. 30, 2016.

Official Communication for European Patent Application No. 15201924.6 dated Apr. 25, 2016.

Official Communication for European Patent Application No. 16152984.7 dated Mar. 24, 2016.

Official Communication for Great Britain Patent Application No. 1404486.1 dated May 21, 2015.

Official Communication for Great Britain Patent Application No. 1404486.1 dated Aug. 27, 2014.

Official Communication for Great Britain Patent Application No. 1404489.5 dated May 21, 2015.

Official Communication for Great Britain Patent Application No. 1404489.5 dated Aug. 27, 2014.

Official Communication for Great Britain Patent Application No. 1404499.4 dated Jun. 11, 2015.

Official Communication for Great Britain Patent Application No. 1404499.4 dated Aug. 20, 2014.

Official Communication for Netherlands Patent Application No. 2012417 dated Sep. 18, 2015.

Official Communication for Netherlands Patent Application No. 2012421 dated Sep. 18, 2015.

Official Communication for Netherlands Patent Application No. 2012438 dated Sep. 21, 2015.

Official Communication for New Zealand Patent Application No. 622473 dated Jun. 19, 2014.

Official Communication for New Zealand Patent Application No. 622473 dated Mar. 27, 2014.

Official Communication for New Zealand Patent Application No. 622513 dated Apr. 3, 2014.

Official Communication for New Zealand Patent Application No. 628161 dated Aug. 25, 2014.

Official Communication for U.S. Appl. No. 13/827,491 dated Dec. 1, 2014.

Official Communication for U.S. Appl. No. 13/827,491 dated Jun. 22, 2015.

Official Communication for U.S. Appl. No. 13/827,491 dated Oct. 9, 2015.

Official Communication for U.S. Appl. No. 14/141,252 dated Apr. 14, 2016.

Official Communication for U.S. Appl. No. 14/141,252 dated Oct. 8, 2015.

Official Communication for U.S. Appl. No. 14/225,006 dated Sep. 10, 2014.

Official Communication for U.S. Appl. No. 14/225,006 dated Sep. 2, 2015.

Official Communication for U.S. Appl. No. 14/225,006 dated Dec. 21, 2015.

(56) References Cited

OTHER PUBLICATIONS

Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.

* cited by examiner

AUDIT LOGS

OVERVIEW  USER LOGS  OBJECT LOGS  DIRECT SEARCH

Showing 1 to 10 of 42 entries

HIGH FREQUENCY OBJECTS

📅 24 July, 2015  X  To  📅 7 August, 2015  X

Previous  [1]  2  3  4  5  Next

| Filter by Activity Category | Object Title | Object ID | Object Type | No. of Interactions |
|---|---|---|---|---|
| ☑ Object Loaded | Object1 | ObjectID1 | Document | 1820 |
| ☑ Object Viewed | Object2 | ObjectID2 | Document | 646 |
| ☑ Object Saved | Object3 | ObjectID3 | Document | 611 |
| ☑ Object Exported | Object4 | ObjectID4 | Document | 519 |
| ☑ Object Imported | Object5 | ObjectID5 | Document | 455 |
| | Object6 | ObjectID6 | Document | 423 |
| | Object7 | ObjectID7 | Document | 404 |
| | Object8 | ObjectID8 | Document | 403 |
| | Object9 | ObjectID9 | Document | 401 |
| | Object10 | ObjectID10 | Document | 397 |

Showing 1 to 10 of 30 entries

Previous  [1]  2  3  Next

FIG. 1C

AUDIT LOGS

OVERVIEW  USER LOGS  OBJECT LOGS  DIRECT SEARCH

VISITED OBJECTS — 502

[📅 26 August, 2015  X]  To  [📅 18 November, 2015  X]

Objects to show [ALL ▼] — 506

[Enter by object name (case sensitive)] — 508

| ☐ | Title | ID | Type | Date of Last Interaction ▲ | No. of Interactions ▲ |
|---|---|---|---|---|---|
| ☑ | Object1 | ObjectID1 | Person | 2015-09-28 | 21 |
| ☐ | Object2 | ObjectID2 | Event | 2015-09-27 | 23 |
| ☐ | Object3 | ObjectID3 | Items | 2015-09-27 | 19 |
| ☐ | Object4 | ObjectID4 | Organization | 2015-09-27 | 18 |
| ☐ | Object5 | ObjectID5 | Person | 2015-09-27 | 18 |
| ☐ | Object6 | ObjectID6 | Document | 2015-09-27 | 13 |
| ☐ | Object7 | ObjectID7 | Document | 2015-09-27 | 13 |
| ☐ | Object8 | ObjectID8 | Document | 2015-09-27 | 13 |

510 ↗ (Type column)  504 ↗ (Date column)

Showing 1 to 10 of 146 entries    Previous [1] 2 3 4 5 ...... 15 Next

Please select an object above

FIG. 5

AUDIT LOGS

OVERVIEW  USER LOGS  OBJECT LOGS  DIRECT SEARCH

VISITED OBJECTS

26 August, 2015 X  To  18 November, 2015 X

Enter by object name (case sensitive)

Objects to show  ALL ▼

| | Title | ID | Type | Date of Last Interaction | No. of Interactions |
|---|---|---|---|---|---|
| ☐ | Object1 | ObjectID1 | Person | 2015-09-28 | 21 |
| ☐ | Object2 | ObjectID2 | Event | 2015-09-27 | 23 |
| ☐ | Object3 | ObjectID3 | Items | 2015-09-27 | 19 |
| ☐ | Object4 | ObjectID4 | Organization | 2015-09-27 | 18 |
| ☐ | Object5 | ObjectID5 | Person | 2015-09-27 | 18 |
| ☐ | Object6 | ObjectID6 | Document | 2015-09-27 | 13 |
| ☐ | Object7 | ObjectID7 | Document | 2015-09-27 | 13 |
| ☐ | Object8 | ObjectID8 | Document | 2015-09-27 | 13 |

Showing 1 to 10 of 146 entries

Previous [1] 2 3 4 5 ...... 15 Next

Please select an object above

GENERATED

AUDIT LOGS

OVERVIEW   USER LOGS   OBJECT LOGS   DIRECT SEARCH

Mon Sep 28 2015 07:43:17 GMT+13:00 (NZDT)　　　26 August, 2015  X　　To　　18 November, 2015  X Object Loaded　　　ObjectMethod4

Showing 1 to 10 of 42 entries　　　　　　　　　　Previous  [1]  2  Next

FREQUENTLY SEARCHED TERMS

Enter by query terms (case sensitive)　　　　Search terms to show  50 ▼

| Search term | Frequency |
|---|---|
| ☐ AddressSearchTerm1 | 4 |
| ☐ GeoLocationSearchTerm1 | 4 |
| ☐ CitySearchTerm1 | 4 |
| ☐ CitySearchTerm2 | 4 |

AUDIT LOGS

OVERVIEW  USER LOGS  OBJECT LOGS  DIRECT SEARCH

SELECT OBJECT —902

| event ▼ | Object 1 ▼ | | 26 August, 2015 X | To | 18 November, 2015 X |

904

OBJECT INFORMATION —906

Object Title
Type       event
Object ID  ObjectID1

ACTIVITY FREQUENCY BY USERS —908

910                                                                 912

| User Name ▲▼ | User ▲▼ | Date of Last Interaction ▲▼ | No. of Interactions ▲▼ |
|---|---|---|---|
| User Name 1 | User 1 | 2015-09-22 | 35 |
| User Name 2 | User 2 | 2015-09-22 | 21 |
| User Name 3 | User 3 | 2015-09-25 | 21 |
| User Name 4 | User 4 | 2015-09-23 | 4 |
| User Name 5 | User 5 | 2015-09-24 | 4 |
| User Name 6 | User 6 | 2015-09-23 | 4 |
| User Name 7 | User 7 | 2015-09-24 | 3 |

Showing 1 to 7 of 7 entries                                Previous [1] Next

AUDIT LOGS

OVERVIEW  USER LOGS  OBJECT LOGS  DIRECT SEARCH

USER QUERY — 1204
26 August, 2015 X    To    18 November, 2015 X — 1202

User: [User 1] [User 2 X] — 1208
Activity Category: [DATA_SEARCH X]
Method: — 1210

OBJECT QUERY — 1206

Title
ID
Type

Number of Results [10 ▼]

[Export]

SEARCH RESULTS — 1212

| User ◆ | User Name ◆ | Timestamp ◆ | Audit Type ◆ | Method ◆ |
|---|---|---|---|---|
| User 2 | User Name 2 | Thu Sep 03 2015 23:36:18 GMT+12:00 (NZST) | Search | ObjectMethod1 |
| User 2 | User Name 2 | Thu Sep 03 2015 23:36:18 GMT+12:00 (NZST) | Search | ObjectMethod1 |
| User 2 | User Name C | Thu Sep 03 2015 23:13:38 | Search | ObjectMethod1 |

SYSTEM LOG ANALYSIS AND OBJECT USER INTERACTION CORRELATION SYSTEM

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

A large organization (e.g., a corporation, a governmental organization) can include large numbers of employees spread across large numbers of departments, with each employee associated with a user account that can access one or more networks maintained by the organization. In a sensitive environment in which a portion of the employees may have access to private, or otherwise sensitive, data, the organization can desire to audit the behavior of its employees with respect to the data. In general, the organization can maintain records and copies of electronic reports generated by employees, and determine access to the private, or sensitive, data based on an analysis of the electronic reports.

SUMMARY

A described system can access logs generated by network accessible systems, and determine objects (e.g., documents, presentations, e-mails, and so on) that have been interacted with (e.g., exported, imported, viewed, printed, e-mailed) by users of one or more networks associated with the network accessible systems. The system can determine, from large quantities of logs, summary information regarding objects and users, including the most frequently interacted with objects, and users that most frequently interacted with objects. In this way, the system can provide insights into otherwise incomprehensible log data generated in the normal course of the network accessible systems execution.

Due to the complexity of user interactions with objects stored on networks, an organization that maintains the networks can have tremendous difficulty determining which users accessed particular objects, which objects were accessed by particular users, and recreating the workflow history of a particular user or object. This can be a severe problem when the organization, or an auditing organization, desires to determine whether objects have been accessed in a proper, or otherwise reasonable manner or whether users have been accessing objects in a proper, or otherwise reasonable manner, and to ensure that private, or otherwise sensitive, data is treated in a manner that comports with the organization's practices. As an example, a governmental entity can have access to objects (e.g., electronic records) describing private details of citizens. An auditing organization (e.g., a governmental reviewing, or auditing, group within the governmental entity) can have a need to ensure that the objects are being accessed for specific approved purposes. Lacking in methods to accomplish this, the public's faith in the governmental entity to maintain objects can be substantially reduced.

The system described below can correlate large quantities of logs, and visualize the log data to allow for a reviewing user (e.g., the governmental reviewing group) to quickly ascertain information related to objects or users. As will be described, the system can generate user interfaces that allow for previously impossible looks into log data spread across network accessible systems. As an example, a reviewing user can quickly cycle through generated user interfaces to recreate a workflow of a particular user (e.g., determine which objects were accessed by the particular user, determine search queries entered by the particular user to locate objects, and determine frequencies of the user's access of each object). In this way, the reviewing user can ensure that the particular user is following best or proper practices.

As another example, a reviewing user can quickly ascertain which objects are frequently being accessed (e.g., accessed above a threshold), and which objects are rarely being accessed (e.g., accessed below a threshold). The reviewing user can then take particular actions, such as relocating commonly accessed objects to faster storage, or spreading the commonly accessed objects across multiple network accessible systems for duplication purposes, or to make the objects physically closer to clusters of users that have a need to access them. Additionally, the reviewing user can determine that the less commonly accessed objects can be relocated to slower storage (e.g., cold storage), or removed from storage entirely. Furthermore, the reviewing user can determine that objects of a particular type (e.g., document, event, e-mail), or that describe a particular subject matter, are rarely accessed, and determine that future objects of the same type or subject matter should be automatically moved to slower storage. In this way, the described system can decrease processing time, access time to objects by users, and make better use of storage and network accessible systems.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Particular embodiments of the subject matter described in this specification can be implemented so as to realize one or more of the following advantages. A system can generate user interfaces describing user actions of users of one or more networks, with the user actions associated with objects accessible through the networks, or describing actions on objects accessible through one or more networks, with the actions associated with users of the networks. Since the user actions and object actions are stored across large quantities of log files generated by network accessible systems, without the user interfaces and methods described below, a reviewing user would be unable to obtain important information related to objects or users. In some situations, this information may be time-sensitive (e.g., a reviewing user may have a need to quickly ascertain information buried across large quantities of logs), and without the user interfaces described below, the reviewing user would be unable to obtain information in a timely fashion.

In general, one innovative aspect of the subject matter described in this specification can be embodied in methods that include the actions of obtaining, from the electronic data sources, one or more logs generated by a plurality of network-accessible systems describing one or more user actions of one or more users, the user actions associated with one or more objects accessible over one or more networks associated with the network-accessible systems; determining, from the logs, one or more of the user actions associated with each user, wherein the one or more user actions associated with each user are associated with one or more of the objects; determining, from the logs, one or more of the user actions associated with each object; generating an interactive user interface for presentation on one or more user devices, wherein the interactive user interface: presents summary information, the summary information comprising identification of one or more of the users that have performed one or more of the user actions on greater than a first threshold number of the objects and identification of one or more of the objects that have had greater than a second threshold number of the user actions performed on each object; and presents, in response to receiving information specifying one or more of the identified users and/or objects, information associated with the one or more specified users and/or objects, wherein for the specified users, the interactive user interface presents: identification of one or more of the objects upon which the specified users have performed one or more of the user actions, each identification available for selection, and a timeline describing the one or more user actions of the specified users; and wherein for the specified objects, the interactive user interface presents: identification of one or more of the users that have performed one or more of the user actions on the specified objects, each identification available for selection, and a timeline describing the one or more user actions associated with the specified objects.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the one or more of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with one or more specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

Further, as described herein, various embodiments of the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1C is an example user interface illustrating summary information associated with objects.

FIG. 5 is an example user interface describing objects interacted with by a selected user.

FIG. 6 is an example user interface illustrating selection of an object interacted with by a selected user.

FIG. 8 is an example user interface illustrating frequently searched terms of a selected user during a selected date range.

FIG. 9 is an example user interface illustrating identifications of users that interacted with a selected object during a selected date range.

FIG. 12 is an example user interface illustrating direct search of user interactions associated with objects during a selected date range.

Like reference numbers and designations in the various drawings indicate like elements.

DETAILED DESCRIPTION

Figure 1A:
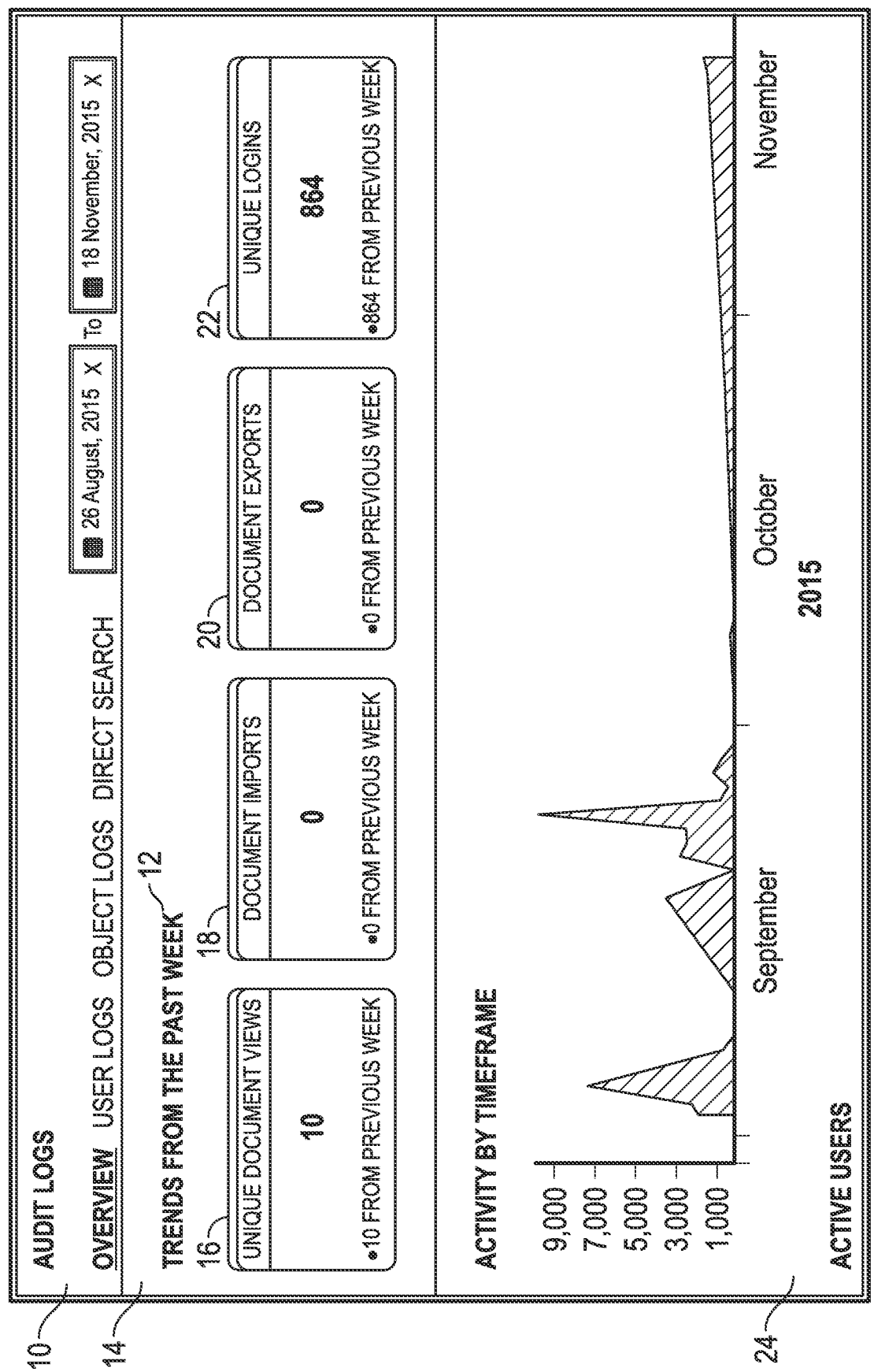
FIG. 1A is an example user interface illustrating summary information associated with users and objects.

This specification describes one or more systems that can obtain logs generated by network accessible systems, and can generate user interfaces (e.g., for presentation to a reviewing user) describing information included in one or more of the logs. The information can include, for example, information describing particular objects accessible using one or more networks, and information describing particular users that have accessed objects, performed searches, or performed other actions using one or more networks.

In this specification, an object is any data which can be accessed, viewed, exported, imported, modified, created, copied, moved, transmitted, downloaded, uploaded, printed, or otherwise acted upon and can be associated with a type, such as a document, an e-mail, information describing a person (e.g., a person object), information describing an event (e.g., an event object), information describing a company, organization, or other entity, and so on. An object can be associated with particular properties (e.g., an attribute of the object associated with a value), and each object type can be associated with particular properties that can be distinct from properties associated with other object types. As an example, a property associated with a document type object can be Title, and a value of the property can be a Title associated with the document. The objects can thus represent an object-centric data model, wherein data (e.g., in the form of files) can be stored in objects and made accessible to users over one or more networks. In this way, a user can search for, and subsequently receive, particular objects that relate to his/her search request.

For a further discussion of objects, and an object-centric data model, this specification hereby incorporates by reference in its entirety, and for all purposes, U.S. patent application Ser. No. 14/875,536, titled "SEARCHES OF HIGHLY STRUCTURED DATA."

As described above, the systems (hereinafter 'the system', which is described further below as the system 100), obtain logs generated by network accessible systems. Upon access (e.g., exporting, viewing, printing, modifying, e-mailing, and so on) of an object by a user, the network accessible system, or other network accessible system or user device, storing, or providing access to, the object can generate a log entry identifying at least the user accessing the object and the object being accessed. Thus, access to any object stored or otherwise maintained to be accessible to users of the networks, can be recorded for posterity and use (e.g., by a reviewing user as will be described). Furthermore, logs can record user actions, such as specific actions the users took with respect to objects (e.g., a download, a viewing, a printing, a modification, an e-mailing, and so on), and with respect to actions associated with identifying, or locating, objects (e.g., search queries entered into a search system, and so on).

The system (e.g., the system 100 described below) can generate user interfaces describing information included in one or more logs, and identify all log entries associated with a particular user or a particular object. To generate the user interfaces, the system can determine (e.g., as requests for user interfaces are received) summary information associated with particular users and/or objects, or the system can periodically determine summary information and store (e.g., cache) the information for later use. The system can maintain (e.g., in one or more databases) information associated with each user (e.g., such user's actions associated with objects) and/or each object (e.g., interactions by users with such object), and can determine summary information for a given time period. This summary information can be presented in interactive user interfaces (e.g., as described in FIGS. 1A-1C for summary information of all users and objects, or as described in FIGS. 4-11 for summary information of particular users or particular objects).

As will be described summary information can include tallies related to objects accessed by certain users, and tallies related to users that access certain objects. For instance, summary information can include a total amount of unique accesses to objects (e.g., a number of accesses to objects not including repeat accesses by the same user), identifications of one or more users and numbers of accesses to objects each user made, identifications of one or more objects and numbers of unique accesses to each object, and so on.

FIG. 1A is an example user interface 10 illustrating summary information associated with users and objects. The user interface 10 is an example of an interactive user interface presented on a user device (e.g., a laptop, a tablet, a computer) of a reviewing user as an interactive document (e.g., a web page), which can be rendered or otherwise presented on the user device.

As described above, a system (e.g., the system 100 described below) can generate user interfaces describing summary information associated with users and objects. In the example user interface 10, trend information 12 is included providing the reviewing user a quick glance at summary information of users of network accessible systems and objects accessed by the users. While user interface 10 indicates "Trends from the Past Week" 12, the time period of "Past Week" can be modified by the reviewing user to update the time period from which trend information 12 is to be determined. In some implementations, the reviewing user can select the "Trends from the Past Week" 12, and the user interface 10 can be updated to provide a refinement of the time period (e.g., a user interface element can be presented that includes one or more options for a new time period, and/or the user interface element can receive a time entered by the reviewing user). In some implementations, the reviewing user can interact with a date range 14 specifying a time period of interest to the reviewing user, and if the time period of interest is less than a week, the trend information 12 can be updated to include trend information from a shorter time period (e.g., a time period encompassing the specified time period in the date range 14). Similarly, if the time period of interest is greater than a week, in some implementations, the trend information 12 can be updated to include trend information from a greater time period (e.g., the time period can be a month, a quarter, and so on).

As illustrated, the trend information 12 includes information describing unique object accesses 16 (e.g., in the time period indicated in the trend information 12, which as illustrated in the example of FIG. 1A is the previous week). The unique object views 16 indicates a number of accesses to objects by users, with multiple accesses of a same object by a user counted a single time. As an example, the reviewing user can determine a general activity level by all users using the trend information 12.

The trend information 12 further includes information describing object imports 18, indicating a number of objects that were imported (e.g., uploaded to one or more network accessible systems for storage as identified in logs) during the time period indicated in the trend information 12. Similarly, the trend information further includes information describing object exports 20, indicating a number of objects that were exported by users (e.g., e-mailed, printed, downloaded) during the time period indicated in the trend information 12.

The trend information 12 further includes unique logins 22 by users, and indicates a number of users that logged into the system and may have interacted with objects (e.g., accessed objects, imported objects, searched for objects, and so on). In some implementations, the unique logins 22 can represent a total number of logins by all users.

The example user interface 10 includes a graphical representation 24 of activity during the date range 14, which as described above can be selected by the reviewing user, or automatically selected (e.g., to correspond to a prior week, quarter, year, and so on). The example graphical representation 24 is a chart mapping activity to specific time periods included in the date range 14. Activity in this specification includes any activity associated with objects performed by users, which can include searching for objects, accessing objects, importing objects, exporting objects, and so on.

Figure 1B:
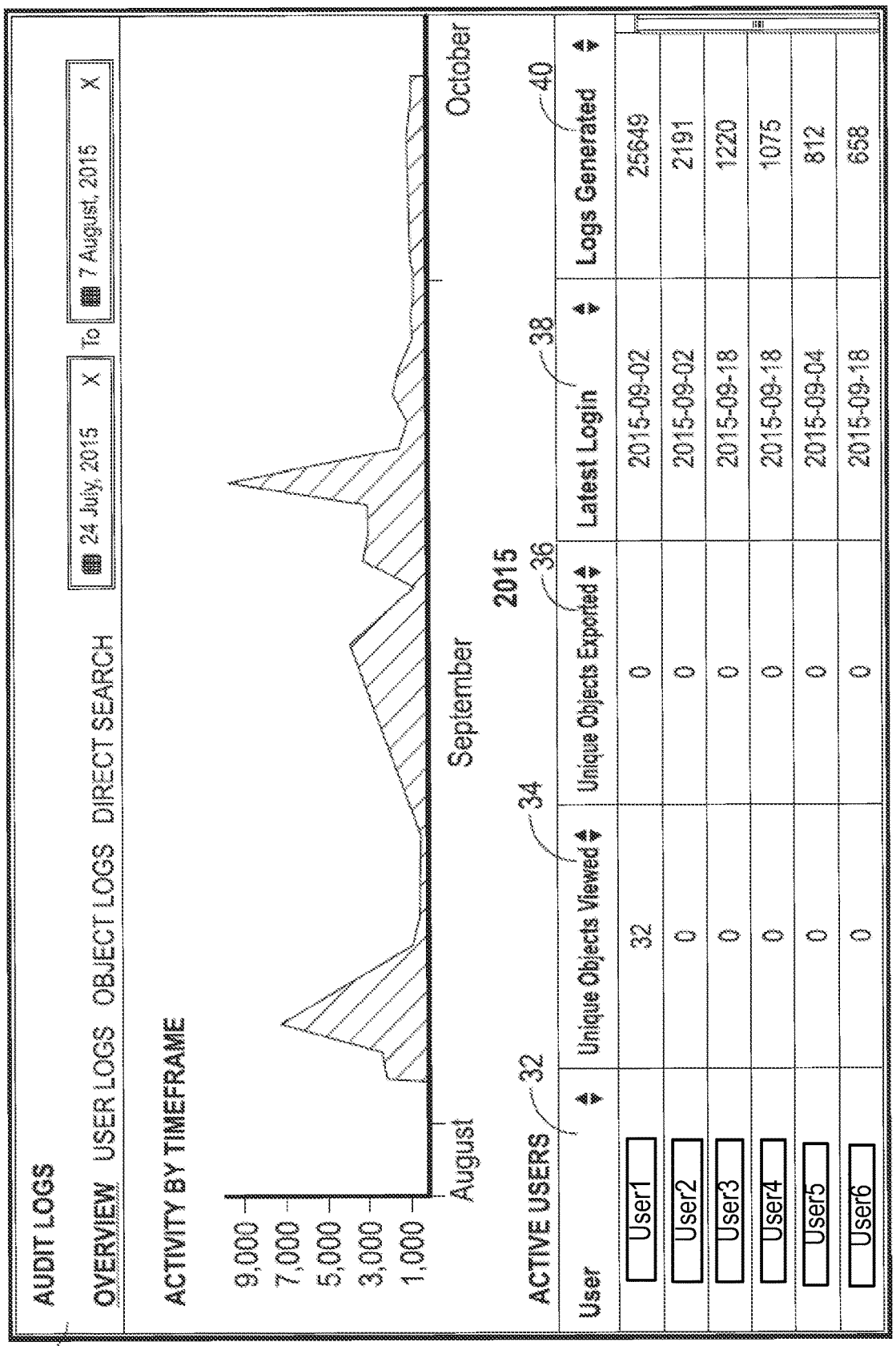
FIG. 1B is an example user interface illustrating summary information associated with users.

FIG. 1B is an example user interface 30 illustrating summary information associated with users. The example user interface 30 indicates users (e.g., active users 32) organized (e.g., presented in ascending or descending order) according to a relative value of one or more metrics (e.g., 34-40). Each of the metrics (e.g., 34-40) can be interacted with by the reviewing user, which will cause the user interface 30 to be updated to organize the users according their relative value of the interacted with metric. In some implementations, the user interface 30 can include information describing each user (e.g., separately paginated), or the user interface 30 can include information describing users associated with values of the metrics (e.g., 34-40) that are greater than a threshold, providing the most active users.

The user interface 30 includes an indication of a number of unique objects viewed 34 by respective users. That is, the number of unique objects viewed 34 for a particular user (e.g., "User1") indicates a number of objects accessed by the particular user one or more times (e.g., in the example of FIG. 1B, user "User1" accessed 32 objects).

The user interface 30 includes an indication of a number of unique objects exported by respective users. For instance, user "User1" exported 0 objects.

In addition, the user interface 30 includes an indication of the most recent login 38 of the user (e.g., a most recent time that an employee used his/her user account). In some implementations, the most recent login 38 can be the most recent login irrespective of the selected date range 14 (e.g., as illustrated, user "User1" was logged into on 2015 Sep. 2, which is later than the date range 14 ending 7 Aug. 2015). In some other implementations, the latest login 38 can indicate a latest login 38 up until the end of the selected date range 14.

The user interface 30 further includes an indication of a number of logs that were generated (e.g., by network accessible systems as will be described below) based on user interactions with the network accessible systems. As an example, user "User1" was included in 25,649 logs. As described above, a log can include information describing not only interactions associated with objects, but other interactions associated with the user including logins, interactions with network accessible systems (e.g., user access of a network accessible system, user searches, and so on). Therefore, each inclusion in a log does not necessarily mean that user "User1" accessed an object, indeed the user could have searched for objects but not interacted with any, or merely connected to a network accessible system. As another example, user "User2" was included in 2,191 logs, but did not access any objects.

Utilizing user interface 30, the reviewing user can quickly ascertain which users are active. The reviewing user can select a particular user, and receive an updated user interface with information specific to the selected user (e.g., as described below in FIG. 4).

FIG. 1C is an example user interface 50 illustrating summary information associated with objects. The example user interface 50 presents information describing objects that have been organized (e.g., in ascending or descending order) according to one or more metrics (e.g., metric 58 indicating a number of user interactions with an object). Therefore, the user interface 50 can present information describing objects that have been accessed greater than a threshold number of times (e.g., the threshold can depend on a screen size of the user device).

The objects are each associated with a title (e.g., a parameter associated with each object can be a title of the object), and the user interface 50 identifies a respective title 52 for each object. The user interface 50 further includes an "Object ID" 54 associated with each object, which can be a value generated by a system to uniquely identify the object (e.g., in some implementations the ID can be a hash of the object, such as an MD5 hash). In the example, adjacent to the "Object ID" 54 is a type of the object, which as described above in a non-exhaustive list can be a document, an e-mail, an event object (e.g., an object including information that describes an event), a person object (e.g., an object including information that describes a person), and so on.

The user interface 50 indicates a number of user interactions 58 with each object, indicating which objects are frequently accessed by any user. A review user can organize the presented objects according to number of user interactions 58, thus gaining an insight into the large quantities of objects being stored. Each object in the user interface 50 can be selected by the reviewing user, and upon selection the user interface 50 can be updated to present information associated with the selected object (e.g., as described below in FIG. 9).

Since an organization may store large quantities of objects being actively imported, exported, viewed, modified, and so on, the user interface 50 includes a filter control 60 enabling the reviewing user to limit the objects presented. For instance, the filter control 60 enables the reviewing user to limit objects to objects that have been loaded by users, viewed by users, saved by users, exported by users, and imported by users. Upon selection of a particular filter option, the user interface 50 can update to include objects that match the filter option. That is, the system (e.g., the system 100 described below) can identify objects that match the selected filter option, and include identifications of the objects in the user interface 50.

Figure 2:
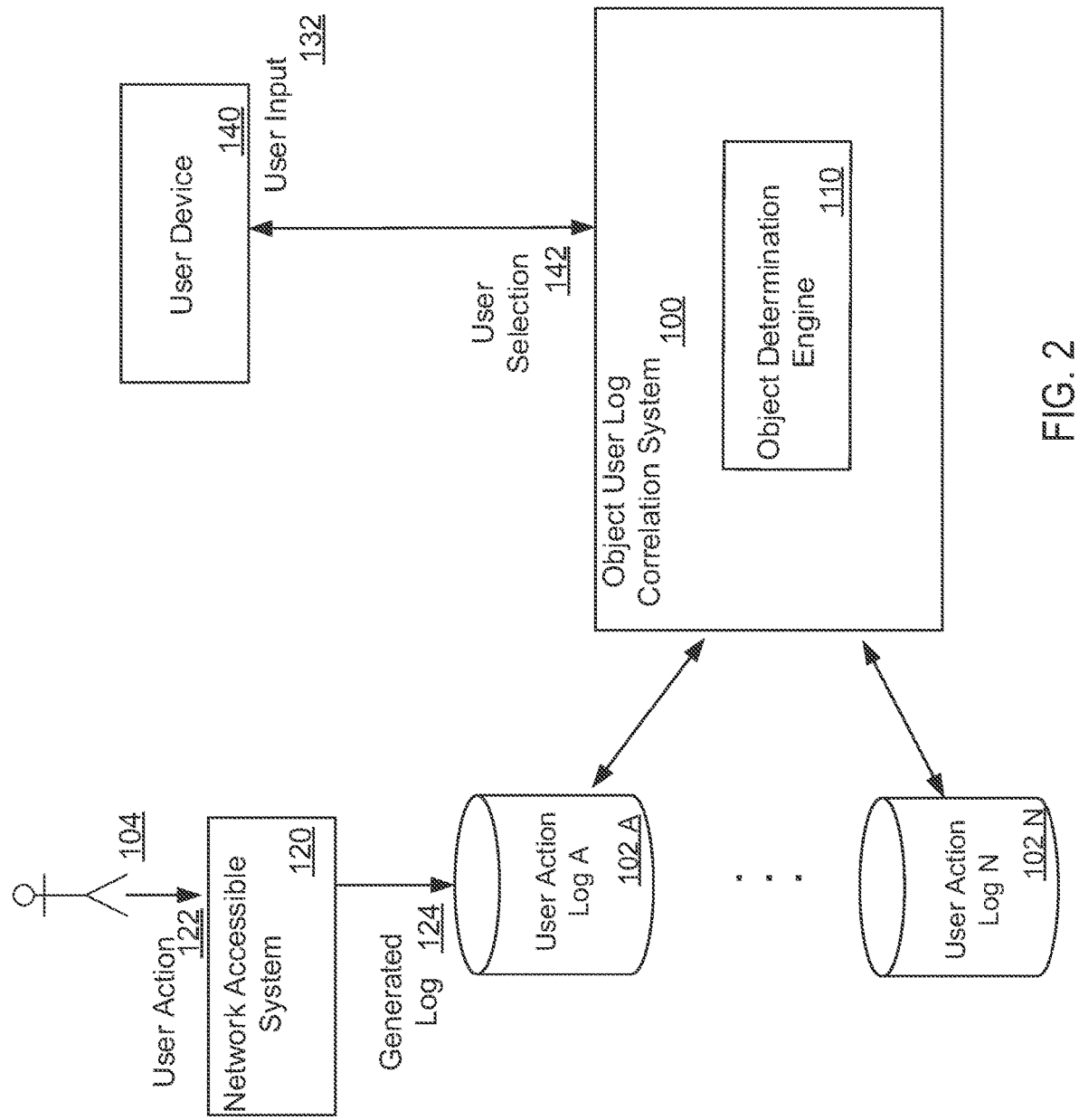
FIG. 2 is an example block diagram of an object user log correlation system.

FIG. 2 is an example block diagram of an object user log correlation system 100 that can access user action logs indicating user interactions associated with objects (e.g., objects maintained or stored by network accessible systems), and can determine summary information associated with objects and users. The object user log correlation system 100 is in communication with a user device 140 (e.g., over a network) and can generate user interfaces for presentation on the user device.

The object user log correlation system 100 includes an object determination engine 110 that can access user action logs (e.g., user action logs A-N 102A-102N) specifying user interactions with network accessible systems, and determine user interactions associated with particular objects maintained by the network accessible systems, and user interactions of particular users that are associated with objects. For instance, the object determination engine 110 can access a log 124 generated by a network accessible system 120 (e.g., in response to user interactions 122 by a user 104), identify a nature of the user interaction (e.g., an object the user accessed, a search query entered by the user to identify objects, and so on), and identify the specific user 104 involved. The object determination engine 110 can then maintain information describing the user interaction of the specific user 104, for later retrieval when generating user interfaces describing summary data of the specific user 104, or objects interacted with by the specific user 104. In some implementations, the object determination engine 110 can index each generated log and maintain information for later searching by a reviewing user using the user device 140 (e.g., the object determination engine 110 can utilize Elasticsearch, and so on to provide search functionality for the reviewing user).

Additionally, the object log determination engine 110 can generate user interfaces 132 describing summary information (e.g., as illustrated in FIGS. 1A-1C) or information associated with particular objects or particular users (e.g., as illustrated in FIGS. 4-11). A reviewing user utilizing the user device 140 can provide user input 142 to received user interfaces 132, and the object log determination engine 110 can receive the user input 142 and generate updated user interfaces.

Figure 3:
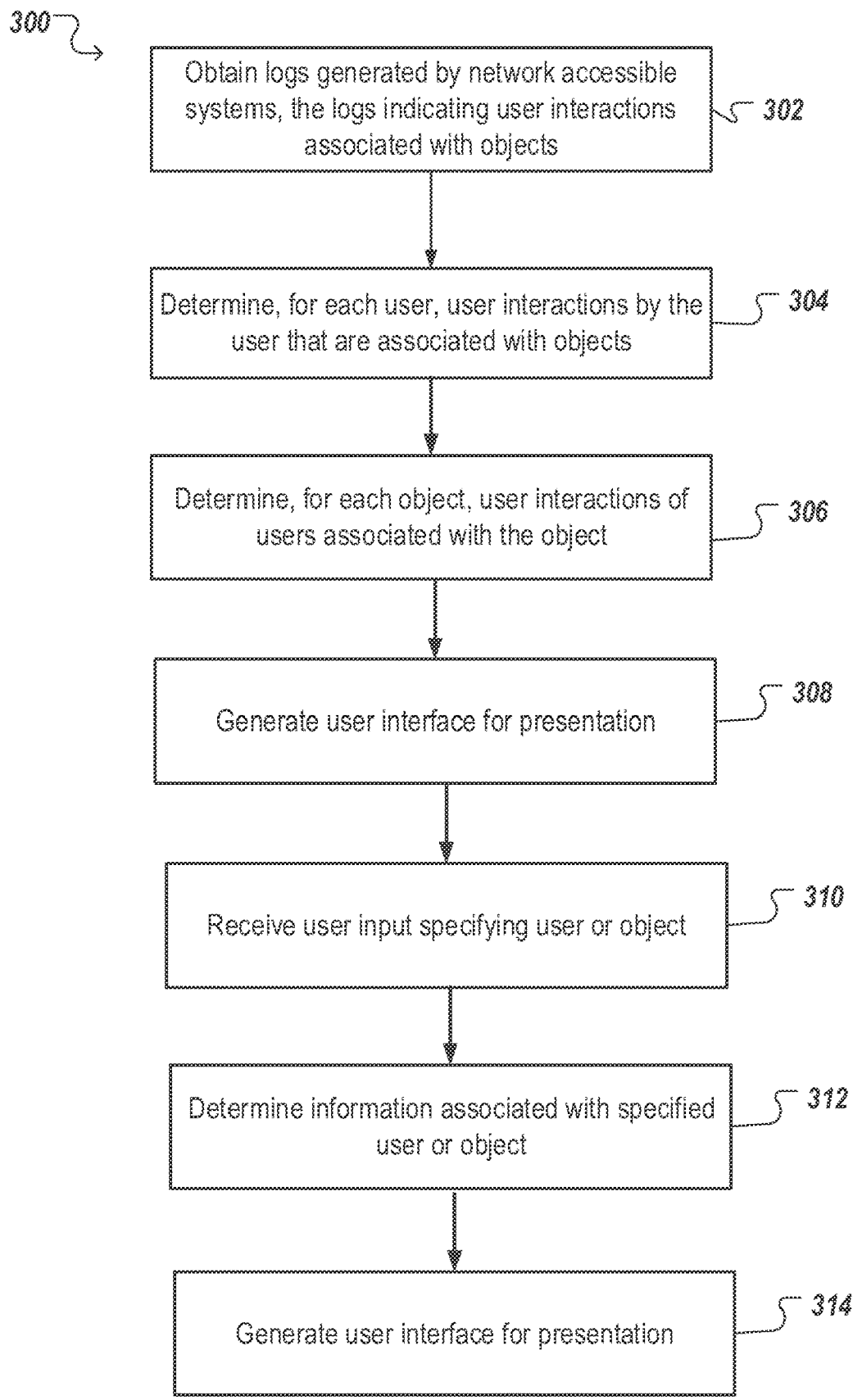
FIG. 3 is a flowchart of an example process for generating user interfaces describing summary information associated with users and objects.

FIG. 3 is a flowchart of an example process 300 for generating user interfaces describing summary information associated with users and objects. For convenience, the process 300 will be described as being performed by a system of one or more computers (e.g., the object user log correlation system 100).

The system obtains logs generated by network accessible systems that indicate user interactions associated with objects (block 302). As described above, users in an organization (e.g., a governmental organization or corporation), can be required to access objects (e.g., documents, e-mails, and so on) that are relevant to particular workflows being implemented by the users. For instance, a user can access objects related to a particular company, and view the related objects to generate reports in the course of their work that describe the particular company. When accessing objects, or tracking user interactions associated with objects (e.g., entering search queries to locate objects), network accessible systems that facilitate access to, or store, objects can generate logs describing all received user interactions. As described above (e.g., with reference to FIG. 2), these logs can be stored and maintained in one or more databases.

The system determines user interactions by each user identified in the obtained logs (block 304). To determine summary information of each user, the system identifies, in the logs, user interactions of each user that are associated with objects. The system stores each user interaction along with an associated timestamp, generating a record of user interactions of each user.

Similarly, the system determines user interactions associated with each object (block 306). To determine summary information for each object, the system identifies, in the logs, user interactions associated with each object. The system stores each user interaction along with an associated time-stamp, generating a record of user interactions with each object.

The system generates user interfaces for presentation describing information included in the logs (block 308). As illustrated in FIGS. 1A-1C, and further illustrated and described below in FIGS. 4-12, the system generates interactive user interfaces to enable a reviewing user to perform complicated workflows, such as recreating a workflow of specific users, or workflows that involved specific objects, and verifying whether users are following best practices or acting in an unauthorized manner.

As an example, the system receives user input specifying a user or object (block 310). As will be described below, the reviewing user can initially receive and view an interactive user interface describing summary data (e.g., as described in FIGS. 1A-1C). The reviewing user can select, or search for, a user or object that interests the reviewing user.

In some implementations, the system can automatically select a user or object for the reviewing user to review. As a particular example, and as will be described further below, the reviewing user can receive triggered information transmitted to his/her user device from the system (e.g., the user device can execute an application or other software in communication with the system for quickly receiving updates). The triggered information can include information describing that a user has exported greater than a threshold number of objects (e.g., greater than an average), and/or at a particular time not known to be associated with the user's working hours (e.g., exported a greater than average number of objects at 2 in the morning), or that a user has attempted to access an object to which such user should not have access, or that a user has attempted to access a sensitive object. The reviewing user can receive this time-sensitive triggered information (e.g., as a short description with a reference, such as a hyperlink, to a user interface generated by the system). The reviewing user can then view information associated with a user.

The system determines information associated with the specified user or object (block 312). As described above, the system maintains information associated with users and objects, including, for each user, user interactions associated with objects, and for each object, user interactions with the object. The system accesses the maintained information (e.g., the system can search one or more databases) and obtains relevant information for the reviewing user's specification.

The system generates a user interface for presentation (block 314). The system generates user interface data for presentation to the reviewing user that includes information associated with his/her specified user or object.

The information determined above in blocks 302 and 314 can be maintained as searchable data by the system, allowing the system to receive requests for particular information from the reviewing user, and quickly generate user interfaces including the requested information.

User Interfaces

User interfaces described in FIGS. 4-12 are examples of interactive user interfaces generated by a system (e.g., the object user log correlation system 100, and presented on a user device. In some implementations, the user interfaces can be presented on the user device as an interactive document (e.g., a web page) in an application (e.g., a web browser).

Each of the user interfaces described below includes user selectable options, which upon selection, can cause the system to obtain associated information (e.g., from databases 102 A-N), determine updated information, and modify, or generate, user interface data.

In this specification, when reference is made to the system generating user interface data, it should be understood to mean that the system can generate data sufficient to cause a receiving device (e.g., user device) to be able to present the user interface (e.g., render the data, retrieve images and other visual elements for presentation, and so on). Additionally, in some implementations the system can provide data (e.g., summary data of users or objects) and the receiving device (e.g., user device) can access information describing user interfaces and present the received data in one or more of the user interfaces (e.g., the user device can execute an application that can receive data and present the data).

Additionally, users can be organized according to departments, office, building, team, group, employee role, or other useful category and summary information (e.g., as described in FIGS. 1A-1C) can be summary information associated with users in a particular category. Similarly, particular objects can be permissible to access only by users in a particular category. Therefore, objects can be filtered according to a particular category. A reviewing user can then determine whether a user outside of the permissible categories has accessed an object. The system can be in communication with one or more databases, or systems in communication with storage systems, which describe user information including group membership information, employee information, and so on.

Figure 4:
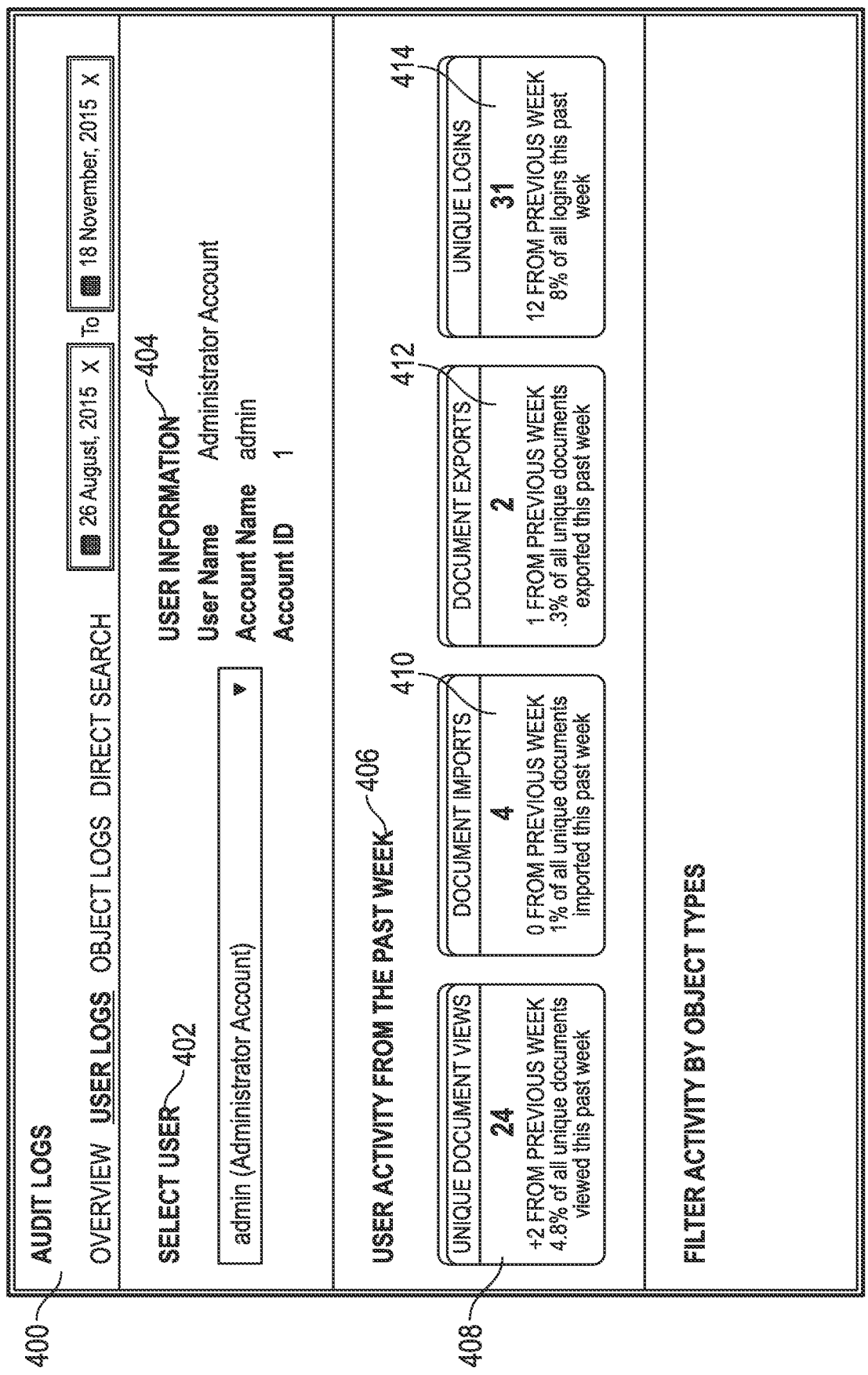
FIG. 4 is an example user interface illustrating information associated with a particular user.

FIG. 4 is an example user interface 400 illustrating information associated with a particular user. The user interface 400 includes functionality to select a particular user. That is, in the example of FIG. 4, the user interface 400 includes a user interface element 402 in which a reviewing user can enter an identifier associated with a particular user (e.g., a name of the particular user). In some implementations, the reviewing user can enter a portion of an identifier associated with the particular user, and the system can provide suggestions of user's that are potential matches. Additionally, in some implementations the reviewing user can enter natural language search queries describing a user of interest. The user interface 400 can also be presented upon a user selection of a particular user identified in summary information (e.g., as described in FIGS. 1A-1C), or as identified as a user that interacted with a particular object (e.g., as described below in FIGS. 9-11).

After the reviewing user selects the particular user, the user interface 400 can be updated to include user information 404 associated with the particular user, such as a user name of the particular user (e.g., a name of an employee associated with the particular user), an account name of the particular user (e.g., a login name of the particular user), and an account ID associated with the particular user (e.g., a unique identifier specific to the particular user). The reviewing user can examine the user information 404 to determine whether the particular user is the user he/she wishes to review.

As described above, with reference to trend information 12 in FIG. 1A, the user interface 400 includes user activity 406 associated with a prior time period (e.g., the prior week as illustrated in the example). This prior time period can be selectable by the reviewing user, or determined automatically as described in FIG. 1A. The user activity 406 indicates summary information of user interactions by the particular user with objects.

For instance, user activity 406 includes an identification of unique object accesses 408 (e.g., a number of unique objects accessed by the particular user). The unique object accesses 408 further identifies a percentage of all unique object accesses that were performed by the particular user, providing a quick summary of the activity of the particular user with respect to other users during the prior time period (e.g., the prior week). Additionally, the unique object accesses 408 indicates a delta (e.g., a difference) from the prior time period (e.g., the week before the prior week). In this way, the reviewing user can note any upticks or other changes in object access.

User activity 406 further includes indications of numbers of objects that have been imported 410, and exported 412, by the particular user. These indications can provide the reviewing user with information relevant to how active the particular user is with bringing in new information, or exporting information. Similar to the above, the object imports 410 and exports 412 include indications of a delta from the prior time period to the present time period, and percentages of all object imports, and exports, performed by the particular user.

User activity 406 includes a number of unique logins 414 by the particular user, which in the illustrated example is 4 unique logins. In some implementations, the user interface 400 can include information describing an average (e.g., central measure of tendency) of unique logins of the particular user for the time period, and/or an average of unique logins of all users, or users of a same, or similar, employee role or other user category as the particular user. The number of unique logins 414 further indicates a delta from a prior time period, and a percentage of all the unique logins performed by the particular user.

FIG. 5 is an example user interface 500 describing objects 502 interacted with by a selected user (e.g., the particular user described in FIG. 4). The objects can be organized (e.g., in descending or ascending order) according to one or more metrics associated with each object's access (e.g., a time of the most recent interaction 504, a number of interactions 506, and so on). In some implementations, the reviewing user can access the user interface 500 by scrolling down on the user interface presented in FIG. 4.

The objects 502 interacted with by the selected user are indicated in a list 508, which can be organized (e.g., in ascending or descending order) according to one or more metrics (e.g., date of last interaction 504, number of interactions 506, and so on). In the case of organizing by date of last interaction, the list 508 can be a timeline of access to objects. Each indication of an object in the list 508 is available for selection, which is described further in FIGS. 6-7.

The list 508 of objects 502 includes titles (e.g., name of the object as stored on a network accessible system) associated with the objects (e.g., "Object1", "Object2", and so on), along with associated identification numbers.

In the example user interface 500, a type 510 of each object is presented adjacent (e.g., in the presented table) to the identification number. As described above, objects can be associated with types, some examples of which include documents, e-mails, person objects, organization objects (e.g., information describing an organization, such as information organized by key-value pairs that describe the organization), and so on. For example, for the object associated with title "Object1," the type is a person object. The reviewing user can view this information, and determine that the selected user viewed information describing the person "Object1" (e.g., most recently on "2015 Sep. 28," and a total of 21 times during the date range 512).

Using the user interface 500, the reviewing user can quickly ascertain objects interacted with by the selected user (e.g., organized by quantity of interaction). Since the reviewing user can modify the date range 512, the reviewing user can determine what focus the selected user had, and can determine whether the selected user was accessing objects according to best practices and within the scope of the selected user's work.

As described above, each object 502 included in the list 508 can be selected by the reviewing user. For instance, as illustrated in FIG. 6, the reviewing user has selected the person object "Object1", and the user interface can be updated to describe summary information, and detailed information, associated with user interactions with the selected object. As illustrated, the selection of "Object1" can be indicated in the user interface, such as by highlighting, bolding (e.g., as illustrated), or otherwise indicating the selection.

Figure 7:
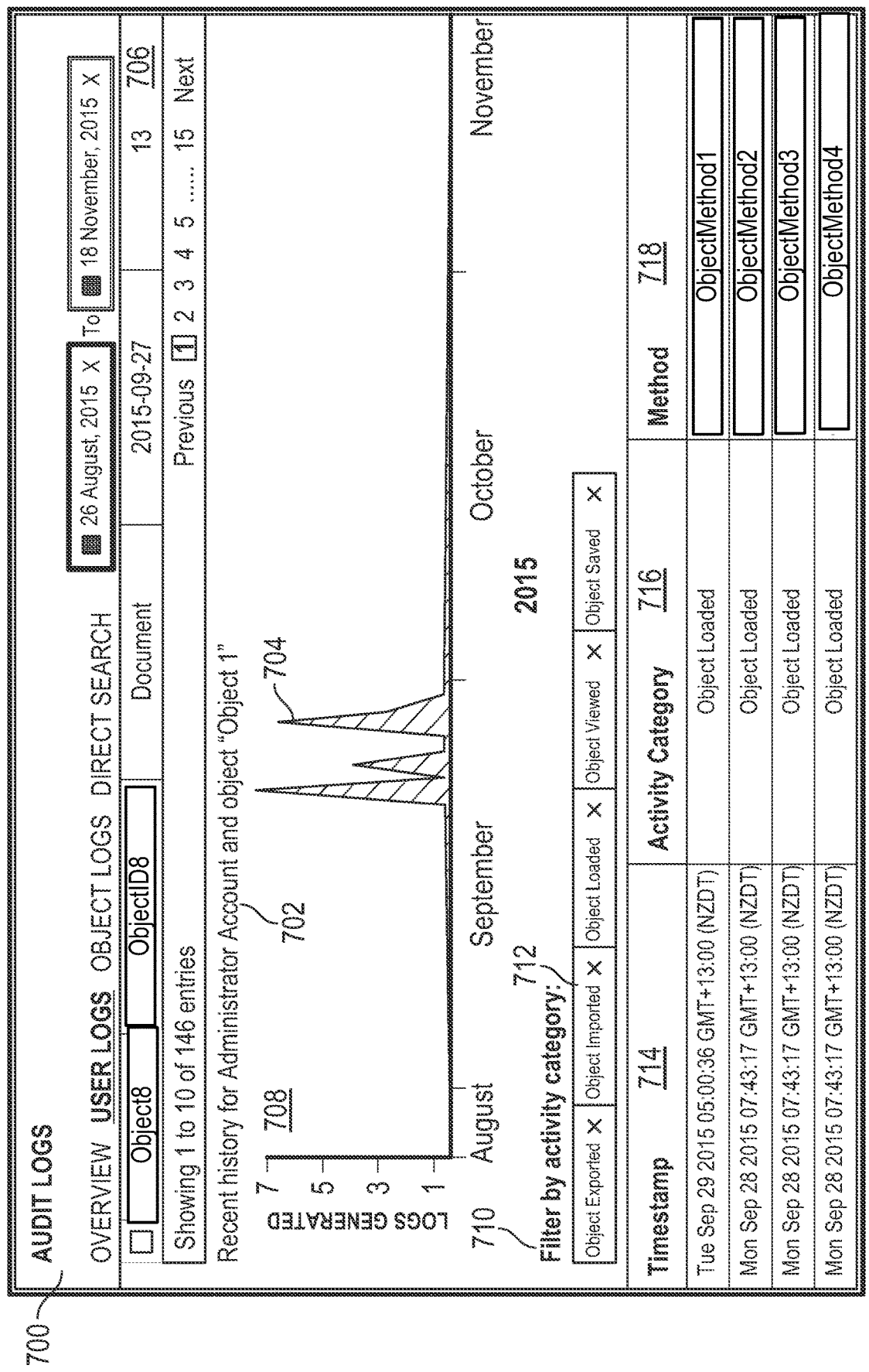
FIG. 7 is a user interface illustrating user interactions of a selected user with a selected object during a selected date range.

FIG. 7 is a user interface 700 illustrating user interactions of a selected user 702 with a selected object 704 (e.g., "Object1" selected in FIG. 6) during a selected date range 706. The user interface 700 includes a graphical representation 708 of times during which user interactions with the selected object 704 occurred. For instance, as illustrated the graphical representation 708 is a chart mapping "logs generated" to times during the selected date 706. Since as described above, user interactions with objects trigger generation of logs, the system can identify a number of logs generated in response to user interactions with the selected object 704. This number of logs generated therefore represents a number of user interactions with the selected object 704. The reviewing user can view the user interface 700 and determine that during a very precise date range (e.g., latter part of September), the selected user 702 was interested in the selected object 704.

The user interface 700 further includes detailed information 710 describing particular user interactions with the selected object 704 by the selected user 702, arranged as in a timeline. As illustrated, a list 714 (e.g., a timeline when organized by timestamp) of particular user interactions is presented, which can be filtered according to filter categories 712 that describe the user interactions. For instance, the filter categories 712 include "object exported," "object imported," "object loaded," "objected viewed," and "object saved." The reviewing user can interact with a filter category 712, and the user interface 700 can be updated to include only user interactions associated with the filter category (e.g., only user interactions in which the selected object was loaded are retained in the list 714), or the user interface 700 can be updated to remove user interactions associated with the filter category.

The list 714 includes timestamps of each user interaction, along with the associated user interaction category 716 and a method 718 invoked by the user interaction (e.g., a programming method such as a JAVA method associated with the user interaction).

FIG. 8 is an example user interface 800 illustrating frequently searched terms 804 of a selected user during a selected date range 802. As described above, user interactions associated with objects can include search queries and search terms entered by users to locate, or identify, objects.

The frequently searched terms 804 include particular search terms 806 entered by the selected user (e.g., "AddressSearchTerm1") along with a frequency 808 of entry (e.g., a number of times the reviewing user entered the search term).

Each search term 806 is available for selection, and upon selection the user interface 800 can be updated to show specific times (e.g., time of day and date) that the search term was entered. In this way the reviewing user can determine whether search terms were entered outside of working hours or more frequently than usual or reasonable (e.g., which might indicate that the selected user account has been compromised, or that the selected user is accessing objects not in line with a work approved purposed).

Similar to the above discussion of a reviewing user selecting a user, the reviewing user can select an object and receive similar summary and detailed information regarding user interactions by any user with the selected object. In some implementations, the user interfaces generated and presented for a selected object are the same, or similar, to user interfaces generated and presented for a selected user. As such, in these implementations features described above in FIGS. 4-8 can be included in FIGS. 9-11, even when not specifically recited in the below discussion.

FIG. 9 is an example user interface 900 illustrating identifications of users that interacted with a selected object 902 during a selected date range 904. The user interface 900 includes a user interface element to select the object 902, which as described above (e.g., with reference to FIG. 4) can allow the reviewing user to enter a title associated with an object and/or select an object from a drop-down menu.

After receiving a selection of an object 902, the user interface 900 can be updated to include object information 906 associated with the object (e.g., parameters associated with the object). For instance, the object information 906 includes a title associated with the selected object, a type of the object, and a unique object identifier.

The user interface 900 includes identifications of users that have interacted with the selected object 902. As illustrated, a list 908 identifies users arranged (e.g., in ascending or descending order) according to one or more metrics (e.g., a date of a most recent interaction 910, a number of interactions 912 with the selected object 902 by each user, and so on).

The list 908 identifies a user name for each user (e.g., an employee name associated with the user), along with an associated user identifier (e.g., a log-in name). Each user identified in the list 908 can be selected, which in some implementations will cause the user interface 900 to update to include user interface 400 describing the selected user.

Figure 10:
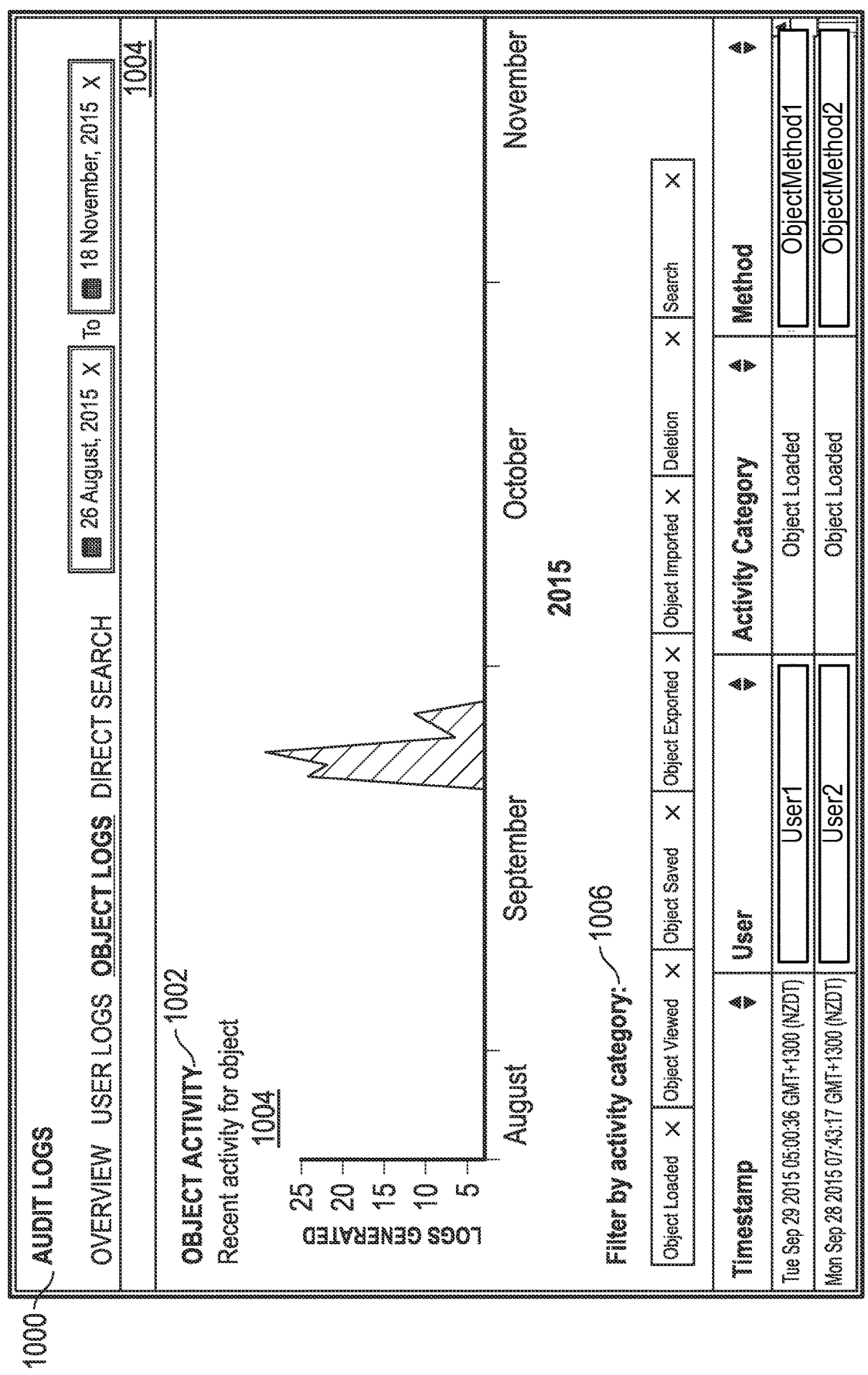
FIG. 10 is an example user interface illustrating summary information associated with a selected object during a selected date range.

FIG. 10 is an example user interface 1000 illustrating summary information 1002 associated with a selected object during a selected date range 1004. The summary information 1004 includes a graphical representation 1004 of user inter actions with the selected object, which in the example user interface 1000 is a chart mapping number of logs generated to times during the selected date range 1004.

Additionally, the example user interface 1000 includes filter categories 1006, which upon selection cause the user interface 1000 to be updated to remove user interactions associated with the filter category, or solely to include the selected filter category(s). For instance, in an example if the reviewing user selects the filter category 1006 ("Object Loaded"), all user interactions associated with the object being loaded can be removed. The graphical representation 1004 is then updated in the user interface 1000 to remove generated logs associated with the object being loaded.

Figure 11:
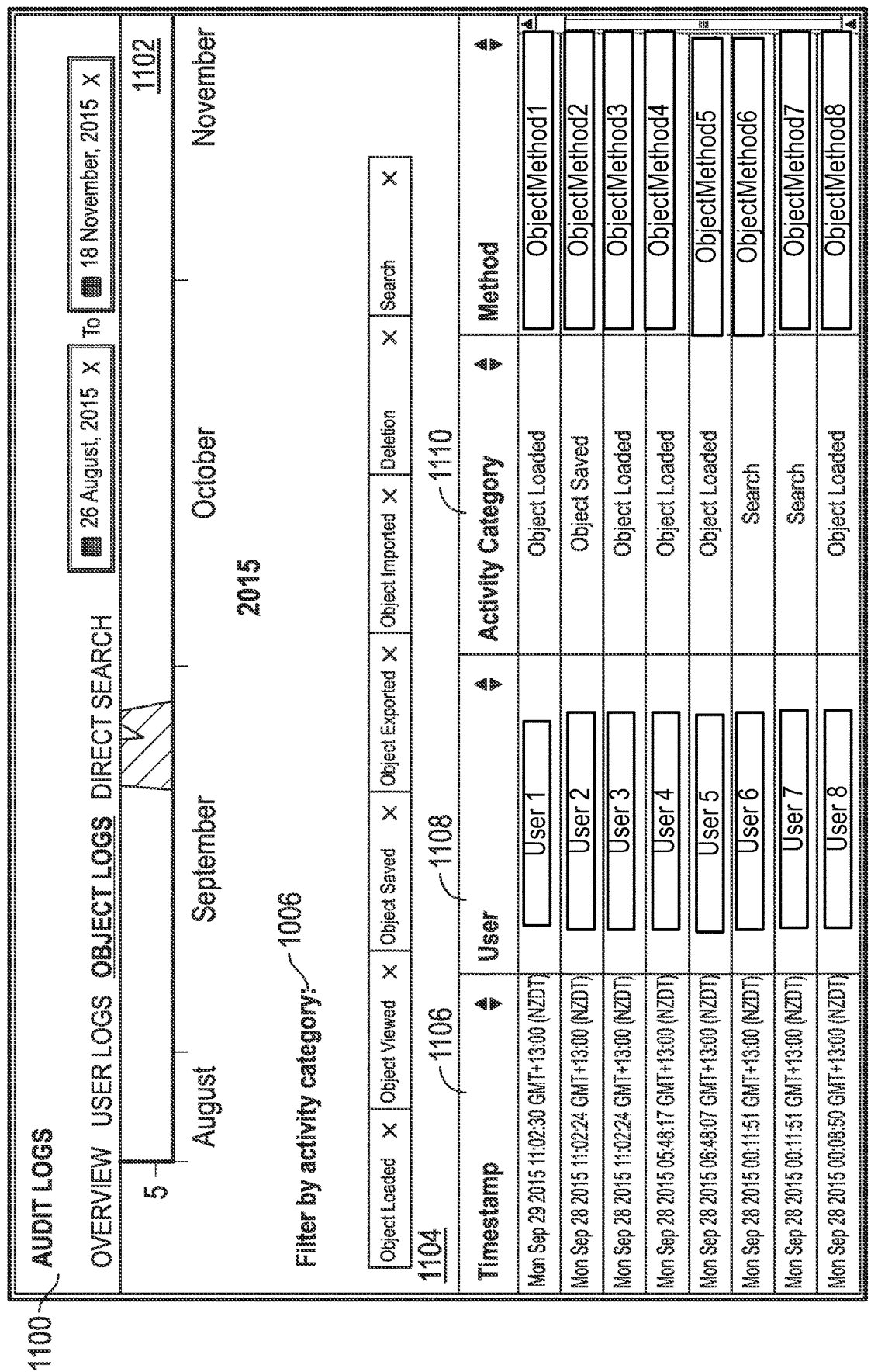
FIG. 11 is an example user interface illustrating detailed information describing user interactions with a selected object by users during a selected date range.

FIG. 11 is an example user interface 1100 illustrating detailed information describing user interactions with a selected object by users during a selected date range 1102. The user interface 1100 includes a list 1104 of user interactions by users (e.g., the list 1104 can be a timeline when organized according to timestamp 1106). As described above in FIG. 10, the detailed information can be filtered according to one or more filter categories 1006, which upon selection will cause the user interface 1100 to be updated.

As in FIG. 7, the list 1104 includes identifications of timestamps 1106 associated with each user interaction, identifications of users 1108 associated respective user interactions, and a user interaction category 1110 (e.g., the filter categories 1006). In some implementations, all user interactions associated with a same user can be grouped as a single listing in the list 1104, and upon user selection of a particular user, the user interface 1100 can be updated to include all user interactions of the particular with the selected object during the selected date range 1102.

Utilizing the user interface 1100, a reviewing user can quickly ascertain all user interactions that occurred with the selected object. That is, if the reviewing user has a need to determine all users that viewed the object, the reviewing user can filter the user interactions to solely include "object viewed," and take any additional action with the included information (e.g., select a particular user and view other objects interacted with by the selected user, and so on as described above).

FIG. 12 is an example user interface 1200 illustrating direct search of user interactions associated with objects during a selected date range 1202. The user interface 1200 includes functionality to search for information associated with a particular user (e.g., a user query 1204) or a particular object (e.g., an object query 1206).

User query 1204 includes user interface elements to enter or otherwise indicate information relevant to identifying user interactions of one or more users. For instance, a reviewing user can enter one or more user names 1208, and receive all user interactions of the entered users during the selected date range 1202. The reviewing user can enter a particular user interaction category 1210 (e.g., search queries or search term entered) and receive user interactions of the entered users 1208 that were of the entered user interaction category 1210.

The results of the search are provided in portion 1212, which describes the resultant user interactions and associated information. For instance, as illustrated the reviewing user has searched for user interactions of user "User1" and "User2" that were search queries. The portion 1212 therefore includes the resulting user interactions along with a timestamp of each user interaction (e.g., the user interactions can be organized as a timeline), a user name of the user, a type of user interaction (e.g., a user interaction category), and so on. The reviewing user can select a user and receive detailed information regarding the user interaction (e.g., particular search terms entered as described in FIG. 8) and/or summary/detailed information of user interactions by the user (e.g., as described in FIGS. 4-8).

Similarly, the reviewing user can enter information in an object query 1206, including a title associated with objects, a unique identifier, and a type of objects. The reviewing user can combine the user query 1204 with the search query 1206 to ascertain whether one or more users interacted with one or more objects.

Additional Embodiments

Additional Storage Locations

As described above, the system can determine (e.g., through an analysis of the generated logs) which objects are being utilized at greater than a threshold and less than a threshold. The system can generate user interface data describing that particular objects would benefit by being stored, or maintained, at more than one network accessible system (e.g., server system) and at more than one geographic location.

For instance, the system can determine that greater than a threshold number of users (e.g., the threshold can be user selectable, the threshold can depend on a quantity of users) are utilizing an object. The system can then generate a user interface for presentation to a reviewing user indicating that the object be stored by a faster network accessible system (e.g., a system with faster storage, a system with faster processors, a system connected via a faster network connection). The system can also determine geographic locations from which users are accessing the object (e.g., from log data describing user actions associated with objects, coupled with user access logs indicating locations from which employees utilize their associated user logins). Upon determining that the users are accessing a same object from greater than a threshold distance away from each other, or from a network accessible system storing the object, the system can generate a user interface describing additional geographic locations for the object to be stored in (e.g., copies of the object can be stored by databases, storage systems, computer systems, and so on, located in the additional geographic locations). That is, the system can obtain locations of network accessible systems, and determine a closeness of the systems to users that have historically accessed the object. The system can then generate user interface data describing recommendations regarding the additional locations.

In some implementations, the generated user interfaces can include a control to effect the recommendations provided in the user interfaces. That is, the control can interact with agents (e.g., software executing on network accessible systems storing objects, or one or more systems that directs the network accessible systems) that can direct objects to be stored in additional geographic locations and/or stored by network accessible systems with faster memory, processing power, network connections.

In this way, the system can perform additional functions beyond reviewing user interactions with objects (e.g., as for an audit of user behavior). That is, the system can decrease a time in which users have to wait to access particular objects. The system therefore increases the efficiency at which objects can be presented to users. Similarly, the system can utilize a size of the objects (e.g., a file size) to determine the recommendations regarding additional storage locations. For instance, if an object is greater than a threshold size, the system can determine that storing the object in additional locations will decrease the download time for users. In contrast, of the object is less than a threshold size, the system can determine that the savings in download time are not greater than the increase in storage requirements and complexity regarding multiple storage locations.

Risky User Behavior

In some implementations the system can determine (e.g., without user interaction by a reviewing user) behavior of a user that is risky (e.g., indicative of the user being compromised, indicative of the user not following best practices, and so on). The system can then flag (e.g., identify) particular users for later review by a reviewing user. For instance, the system can flag particular users upon determining that the users are exporting greater than a threshold number of objects. The system can access information indicating averages of object exports by users, by particular users, or by users of a same, or similar, employee role or other user category.

Furthermore, the system can flag users that are accessing objects outside of normal working hours, or flag users that are being logged into from locations not normally associated with employees or operations of a business entity, governmental entity, or other organization. Similarly, the system can determine that users associated with an employee role or other user category are accessing objects not known to be associated with that employee role or user category.

In this way, the system can flag users for review, and increase the security of object access.

Additionally, the system can determine locations to which objects are exported. The system can access additional log data, including e-mail log data, network interaction data, and so on, and determine that after a user exported an object, the object was e-mailed to a particular e-mail address (e.g., e-mail addresses known to be unsafe or not approved). Similarly, the system can access log data generated by operating systems, or by an agent executing on user devices of users, and determine that the exported object was stored on a removable SD Card, and so on. In this way, the system can flag users that are providing objects to locations outside of the networks maintained by the business entity, or governmental entity.

Triggered Information

In some embodiments, alerts and/or notifications are automatically transmitted to the user device of the reviewing user. As described above, the system can generate notifications describing high volumes of object exports, and other anomalous user information (e.g., as described above with respect to Risky User Behavior). The alert and/or notifications can be transmitted at the time that the alert and/or notification are generated or at some determined time after generation of the alert and/or notification. When received by the user device, the alert and/or notification can cause the user device to display the alert and/or notification via the activation of an application on the device (e.g., a browser, a mobile application, etc.). For example, receipt of the alert and/or notification may automatically activate an application on the user device, such as a messaging application (e.g., SMS or MMS messaging application), a standalone application (e.g., a log reviewing application), or a browser, for example, and display information included in the alert and/or notification. If the user device is offline when the alert and/or notification is transmitted, the application may be automatically activated when the user device is online such that the alert and/or notification is displayed. As another example, receipt of the alert and/or notification may cause a browser to open and be redirected to a login page generated by the system so that the entity can log in to the system and view the alert and/or notification. Alternatively, the alert and/or notification may include a URL of a webpage (or other online information) associated with the alert and/or notification, such that when the user device (e.g., a mobile device) receives the alert, a browser (or other application) is automatically activated and the URL included in the alert and/or notification is accessed via the Internet.

Tracking Object Properties/Permissions

In some implementations, the system can monitor object properties and permissions (e.g., read, write, permissible users or groups of users that can access an object, and so on) associated with objects over periods of time. That is, the system can determine whether an escalation of permissions has occurred, and track when the escalation occurred and/or a user that escalated the permissions. As an example, the system can monitor each access of an object and upon an access, can record information describing the present set of properties and/or permissions. The system can determine changes to the properties and/or permissions, and present the information in one or more user interfaces (e.g., in a user interface describing a particular object, or in summary information). Additionally, the system can provide real-time triggered notifications as described above.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the user log correlation system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic Data Sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computerized method performed by one or more computer systems, the method comprising:

obtaining, from one or more electronic data sources, one or more logs generated by a plurality of network-accessible systems describing one or more user actions of one or more users, the user actions associated with one or more objects accessible over one or more networks associated with the network-accessible systems;

determining, from the logs, one or more of the user actions associated with each user, wherein the one or more user actions associated with each user are associated with one or more of the objects, and wherein a user action associated with an object comprises accessing the object or entering a search query usable to identify the object;

determining, from the logs, one or more of the user actions associated with each object;

generating an interactive user interface for presentation on one or more user devices, wherein the interactive user interface:
  presents summary information, the summary information comprising identification of one or more of the users that have performed one or more of the user actions on greater than a first threshold number of the objects and identification of one or more of the objects that have had greater than a second threshold number of the user actions performed on each object; and
  presents, in response to receiving information specifying one or more of the identified users and/or objects, information associated with the one or more specified users and/or objects,
  wherein for the specified users, the interactive user interface presents:
    identification of one or more of the objects upon which the specified users have performed one or more of the user actions, each identification available for selection,
    an indication of one or more search queries entered by the specified users, wherein the entered search queries are usable by the computer systems to identify the respective objects, and wherein upon selection of a search query the interactive user interface presents one or more times at which the selected search query was entered, and
    a timeline describing the one or more user actions of the specified users;
  and wherein for the specified objects, the interactive user interface presents:
    identification of one or more of the users that have performed one or more of the user actions on the specified objects, each identification available for selection,
    a timeline describing the one or more user actions associated with the specified objects, and
    a graphical representation of a metric of a plurality of metrics reflective of interactions with each of the specified objects, wherein the metric measures a quantity of logs in which user actions with the specified object are included, wherein the graphical representation is a chart reflecting respective quantities of logs for a plurality of times.

2. The method of claim 1, wherein the logs are generated in response to one or more of the user actions associated with one or more of the objects.

3. The method of claim 1, wherein the interactive user interface further presents:
  trend information associated with one or more of the objects and/or one or more of the users, the trend information describing summary information for a particular time period,
  wherein the trend information comprises one or more of:
    a number of unique objects that have been accessed by the users,
    a number of unique objects that have been imported by the users,
    a number of unique objects that have been exported by the users,
    a number of unique logins by the users,
    a number of unique users that have accessed the objects,
    a number of unique users that have imported the objects, and
    a number of unique users that have exported the objects.

4. The method of claim 1, wherein the interactive user interface further presents:
  a graphical representation of summary information, the graphical representation comprising a chart that maps one or more of the user actions associated with one or more of the objects to times in a selected date range.

5. The method of claim 1, wherein the interactive user interface further presents:
  information identifying one or more of the objects that have been accessed greater than a threshold number of times by two or more of the users located greater than a threshold distance apart, the information indicating a recommendation that one or more copies of the identified objects are to be stored in one or more additional locations to decrease access time to the identified objects by the users.

6. The method of claim 5, wherein the interactive user interface further presents:
  a control to direct one or more additional network-accessible systems associated with the additional locations to store the copies of the identified objects.

7. The method of claim 1, wherein upon detecting a selection of a first object interacted with by the specified users, the interactive user interface further presents a graphical representation mapping one or more of the user actions associated with the first object to times in a selected date range.

8. The method of claim 1, wherein the interactive user interface further presents:
  a filter control to filter the presented users and/or objects according to one or more associated features,
  wherein upon detecting a selection of a first user, the interactive user interface presents a timeline describing one or more user actions of the first user associated with interactions with one or more objects,
  and wherein upon detecting a selection of a first object, the interactive user interface presents a timeline describing one or more user actions of one or more users associated with interactions with the first object.

9. A system comprising one or more computers and one or more storage devices storing one or more instructions that are operable, when executed by the one or more computers, to cause the one or more computers to perform one or more operations comprising:
  obtaining, from one or more electronic data sources, one or more logs generated by a plurality of network-accessible systems describing one or more user actions of one or more users, the user actions associated with one or more objects accessible over one or more networks associated with the network-accessible systems;
  determining, from the logs, one or more of the user actions associated with each user, wherein the one or more user actions associated with each user are associated with one or more of the objects, and wherein a user action associated with an object comprises accessing the object or entering a search query usable to identify the object;
  determining, from the logs, one or more of the user actions associated with each object;
  generating an interactive user interface for presentation on one or more user devices, wherein the interactive user interface:
    presents summary information, the summary information comprising identification of one or more of the users that have performed one or more of the user actions on greater than a first threshold number of the objects and identification of one or more of the objects that have had greater than a second threshold number of the user actions performed on each object; and presents, in response to receiving information specifying one or more of the identified users and/or objects, information associated with the one or more specified users and/or objects, wherein for the specified users, the interactive user interface presents:

identification of one or more of the objects upon which the specified users have performed one or more of the user actions, each identification available for selection, an indication of one or more search queries entered by the specified users and respective frequencies of entry by the specified users, wherein the entered search queries are usable by the computer systems to identify the respective objects, and a timeline describing the one or more user actions of the specified users;

and wherein for the specified objects, the interactive user interface presents:

identification of one or more of the users that have performed one or more of the user actions on the specified objects, each identification available for selection, a timeline describing the one or more user actions associated with the specified objects, and a graphical representation of a metric of a plurality of metrics reflective of interactions with each of the specified objects, wherein the metric measures a quantity of logs in which user actions with the specified object are included, wherein the graphical representation is a chart reflecting respective quantities of logs for a plurality of times.

10. The system of claim 9, wherein the logs are generated in response to one or more of the user actions associated with one or more of the objects.

11. The system of claim 9, wherein the interactive user interface further presents:

trend information associated with one or more of the objects and/or one or more of the users, the trend information describing summary information for a particular time period, wherein the trend information comprises one or more of:
a number of unique objects that have been accessed by the users,
a number of unique objects that have been imported by the users,
a number of unique objects that have been exported by the users,
a number of unique logins by the users,
a number of unique users that have accessed the objects,
a number of unique users that have imported the objects, and
a number of unique users that have exported the objects.

12. The system of claim 9, wherein the interactive user interface further presents:

a graphical representation of summary information, the graphical representation comprising a chart that maps one or more of the user actions associated with one or more of the objects to times in a selected date range.

13. The system of claim 9, wherein the interactive user interface further presents:

information identifying one or more of the objects that have been accessed greater than a threshold number of times by two or more of the users located greater than a threshold distance apart, the information indicating a recommendation that one or more copies of the indicated objects are to be stored in one or more additional locations to decrease access time to the identified objects by the users.

14. The system of claim 13, wherein the interactive user interface further presents:

a control to direct one or more additional network-accessible systems associated with the additional locations to store the copies of the identified objects.

15. The system of claim 9, wherein upon detecting a selection of a first object interacted with by the specified users, the interactive user interface further presents a graphical representation mapping one or more of the user actions associated with the first object to times in a selected date range.

16. The system of claim 9, wherein the interactive user interface further presents:

a filter control to filter the presented users and/or objects according to one or more associated features, wherein upon detecting a selection of a first user, the interactive user interface presents a timeline describing one or more user actions of the first user associated with interactions with one or more objects, and wherein upon detecting a selection of a first object, the interactive user interface presents a timeline describing one or more user actions of one or more users associated with interactions with the first object.

17. A non-transitory computer-readable medium storing one or more instructions that when executed by a system of one or more computers causes the one or more computers to perform one or more operations comprising:

obtaining, from one or more electronic data sources, one or more logs generated by a plurality of network-accessible systems describing one or more user actions of one or more users, the user actions associated with one or more objects accessible over one or more networks associated with the network-accessible systems;

determining, from the logs, one or more of the user actions associated with each user, wherein the one or more user actions associated with each user are associated with one or more of the objects, and wherein a user action associated with an object comprises accessing the object or entering a search query usable to identify the object;

determining, from the logs, one or more of the user actions associated with each object;

generating an interactive user interface for presentation on one or more user devices, wherein the interactive user interface:

presents summary information, the summary information comprising identification of one or more of the users that have performed one or more of the user actions on greater than a first threshold number of the objects and identification of one or more of the objects that have had greater than a second threshold number of the user actions performed on each object; and presents, in response to receiving information specifying one or more of the identified users and/or objects, information associated with the one or more specified users and/or objects,
wherein for the specified users, the interactive user interface presents:
identification of one or more of the objects upon which the specified users have performed one or more of the user actions, each identification available for selection,
an indication of one or more search queries entered by the specified users, the indicated search queries having been entered greater than a threshold number of times, wherein the entered search queries are usable by the computer systems to identify the respective objects, and
a timeline describing the one or more user actions of the specified users;
and wherein for the specified objects, the interactive user interface presents:
identification of one or more of the users that have performed one or more of the user actions on the specified objects, each identification available for selection,
a timeline describing the one or more user actions associated with the specified objects, and
a graphical representation of a metric of a plurality of metrics reflective of interactions with each of the specified objects, wherein the metric measures a quantity of logs in which user actions with the specified object are included, wherein the graphical representation is a chart reflecting respective quantities of logs for a plurality of times.

18. The computer-readable medium of claim 17, wherein the logs are generated in response to one or more of the user actions associated with one or more of the objects.

19. The computer-readable medium of claim 17, wherein the interactive user interface further presents:
trend information associated with one or more of the objects and/or one or more of the users, the trend information describing summary information for a particular time period,
wherein the trend information comprises one or more of:
a number of unique objects that have been accessed by the users,
a number of unique objects that have been imported by the users,
a number of unique objects that have been exported by the users,
a number of unique logins by the users,
a number of unique users that have accessed the objects,
a number of unique users that have imported the objects, and
a number of unique users that have exported the objects.

20. The computer-readable medium of claim 17, wherein the interactive user interface further presents:
information identifying one or more of the objects that have been accessed greater than a threshold number of times by two or more of the users located greater than a threshold distance apart, the information indicating a recommendation that one or more copies of the identified objects are to be stored in one or more additional locations to decrease access time to the identified objects by the users, and
a control to direct one or more additional network-accessible computer systems associated with the additional locations to store the copies of the identified objects.

* * * * *